(12) United States Patent
Orti et al.

(10) Patent No.: US 11,848,722 B2
(45) Date of Patent: Dec. 19, 2023

(54) MITIGATING NEXT INTERFERENCE (71) Applicant: MAXLINEAR, INC., Carlsbad, CA (US)

(72) Inventors: Vicente Grau Orti, Valencia (ES); Diego Arlandis Malonda, Valencia (ES)

(73) Assignee: MaxLinear, Inc., Carlsbad, CA (US)

( * ) Notice: Subject to any disclaimer, the term of this patent is extended or adjusted under 35 U.S.C. 154(b) by 47 days.

(21) Appl. No.: 17/238,067

(22) Filed: Apr. 22, 2021

(65) Prior Publication Data

US 2022/0345179 A1 Oct. 27, 2022

(51) Int. Cl.
*H04B 3/32* (2006.01)
*H04B 3/04* (2006.01)

(52) U.S. Cl.
CPC ............... *H04B 3/32* (2013.01); *H04B 3/04* (2013.01)

(58) Field of Classification Search
CPC .................................. H04B 3/32; H04B 3/04
See application file for complete search history.

(56) References Cited

U.S. PATENT DOCUMENTS

| | | | | |
|---|---|---|---|---|
| 7,142,501 B1* | 11/2006 | Barrass | ................ | H04L 5/1461 |
| | | | | 386/274 |
| 2014/0056312 A1* | 2/2014 | Strobel | ................ | H04J 3/0682 |
| | | | | 370/503 |
| 2015/0215000 A1* | 7/2015 | Colonques | .......... | H04L 12/2878 |
| | | | | 370/201 |
| 2015/0215059 A1* | 7/2015 | Kerpez | ................ | H04M 11/062 |
| | | | | 379/406.01 |
| 2017/0006154 A1* | 1/2017 | Shridhar | ................ | H04Q 5/00 |
| 2019/0319728 A1* | 10/2019 | Strobel | .................... | H04B 3/32 |

* cited by examiner

*Primary Examiner* — Steven Hieu D Nguyen
(74) *Attorney, Agent, or Firm* — Buchalter; Jason W. Croft (57) ABSTRACT

A method to mitigate near end cross talk (NEXT) interference in networks may include receiving, through NEXT interference, a synchronization signal from a reference master node of a first network at a neighbor master node of a neighbor network. The method may also include scheduling, based on the synchronization signal, a cycle of downstream and upstream communications in the neighbor network synchronized with a cycle of downstream and upstream communications scheduled in the first network.

19 Claims, 5 Drawing Sheets

MITIGATING NEXT INTERFERENCE

FIELD

The embodiments discussed herein are related to mitigating near end cross talk (NEXT) interference.

BACKGROUND

Unless otherwise indicated herein, the materials described herein are not prior art to the claims in the present application and are not admitted to be prior art by inclusion in this section.

In a time-division multiple access (TDMA) network, multiple nodes share the same frequency channel or medium by dividing the frequency channel into different time slots. Each node transmits data during its assigned time slots and can receive data during other time slots. In some TDMA networks, the nodes that schedule the time slots are referred to as master nodes, while the other nodes are referred to as slave nodes. Some TDMA networks couple masters nodes to slave nodes over phone lines where one master node coupled to one slave node over one phone line forms one TDMA network. There may be multiple TDMA networks that share a bundle of phone line cables. TDMA networks, especially in the same bundle, may experience NEXT interference and/or far end cross talk (FEXT) interference among them that limits the capacity of each network to deliver high speed communication.

The subject matter claimed herein is not limited to embodiments that solve any disadvantages or that operate only in environments such as those described above. Rather, this background is only provided to illustrate one example technology area where some embodiments described herein may be practiced.

SUMMARY

An example method to mitigate NEXT interference in networks may include receiving, through NEXT interference, a synchronization signal from a reference master node of a first network at a neighbor master node of a neighbor network. The method may also include scheduling, based on the synchronization signal, a cycle of downstream and upstream communications in the neighbor network synchronized with a cycle of downstream and upstream communications scheduled in the first network.

Another example method to mitigate NEXT interference in networks may include generating a synchronization signal at a reference master node. The method may also include transmitting the synchronization signal from the reference master node in a first network. The synchronization signal may be coupled into a neighbor network through NEXT interference. The method may also include scheduling a cycle of downstream and upstream communications in the first network according to the synchronization signal. A neighbor master node in the neighbor network may be configured to receive the synchronization signal through NEXT interference and to schedule, based on the synchronization signal, a cycle of downstream and upstream communications in the neighbor network synchronized with the scheduled cycle of downstream and upstream communications in the first network.

An example system to mitigate NEXT interference in networks may include multiple masters nodes, each communicatively coupled to a different one of multiple slave nodes. The master nodes may include a reference master node and a neighbor master node. The reference master node may be configured to generate and transmit a synchronization signal in a first network of the reference master node and to schedule a cycle of downstream and upstream communications in the first network according to the synchronization signal. The neighbor master node in a neighbor network may be configured to receive the synchronization signal from the reference master node through NEXT interference between the first network and the neighbor network. The neighbor master node may also be configured to schedule, based on the synchronization signal, a cycle of downstream and upstream communications in the neighbor network synchronized with the cycle of downstream and upstream communications in the first network.

BRIEF DESCRIPTION OF THE DRAWINGS

Example embodiments will be described and explained with additional specificity and detail through the use of the accompanying drawings in which.

DESCRIPTION OF EMBODIMENTS

Some solutions to NEXT interference in TDMA networks or other networks may involve the use of a dedicated wire to communicate a common clock to all master nodes for synchronization among them. The dedicated wire obstructs deployments as all master nodes must be located near to each other. This is a hard constraint as, in practice, master nodes may be in different locations and it may be difficult or impossible to provide the dedicated wire to all of them. Furthermore, if the equipment providing the common clock fails, all the networks will fail. In such a scenario, the equipment must be replaced or repaired which may be disruptive in terms of network operation and maintenance.

A network protocol, such as the IEEE 1588 protocol, also referred to as the Precision Time Protocol (PTP or PTP protocol), may alternatively be used to provide synchronization among master nodes. The PTP protocol requires a PTP-compliant network and a master Clock. The required PTP-compliant hardware for a PTP compliant network is relatively expensive compared to non-PTP-compliant hardware. Upgrading current deployed networks to support PTP may therefore be expensive and/or may not be feasible.

Some embodiments described herein may mitigate NEXT interference in TDMA networks or other networks without additional hardware such as a dedicated wire for a common clock and without expensive PTP-compliant hardware. In an example embodiment, a single master node among multiple master nodes operates as a reference master node. The reference master node may generate and transmit a synchronization signal in a first network of the reference master node and may schedule a cycle of downstream and upstream communications in the first network consistent with or according to the synchronization signal. The master nodes may also include a neighbor master node in a neighbor network. The neighbor master node may receive the synchronization signal from the reference master node through NEXT interference between the first network and the neighbor network. The neighbor master node may also schedule, based on the synchronization signal, a cycle of downstream and upstream communications in the neighbor network synchronized with the cycle of downstream and upstream communications in the first network.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1:
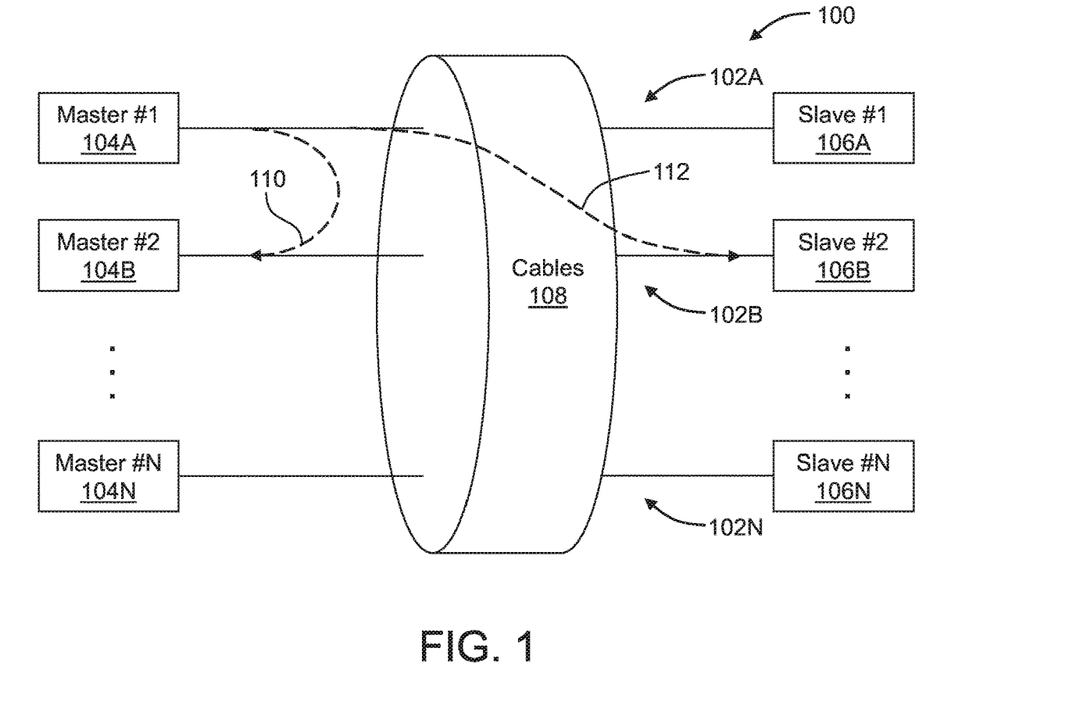
FIG. 1 illustrates an example system of multiple networks which may experience interference between networks.

FIG. 1 illustrates an example system 100 of multiple networks 102A, 102B, . . . 102N (collectively hereinafter "networks 102") which may experience interference between networks 102, arranged in accordance with at least one embodiment descried herein. The system may include multiple master nodes 104A, 104B, . . . 104N (collectively hereinafter "master nodes 104"), multiple slave nodes 106A, 106B, . . . 106N (collectively hereinafter "slave nodes 106") and a bundle of phone line cables 108. Each of the networks 102 included in the system 100 of FIG. 1 includes a master node 104 communicatively coupled to a slave node 106 via a phone line cable included in the bundle of phone line cables 108. For example, the network 102A includes the master node 104A coupled to the slave node 106A via a phone line cable included in the bundle of phone line cables 108.

Each of the networks 102 of FIG. 1 may implement TDMA and may be referred to as a TDMA network. More generally, the embodiments described herein may be applied to any communication networks with interference among nodes in different domains where time synchronization may mitigate the interference. Example communication networks in which embodiments described herein may be implemented include networks that implement one or more of the following technologies or protocols: TDMA, G.fast, G.hn, G.now, G.vlc, and Li-Fi. Alternatively or additionally, the communication networks in which embodiments described herein may be implemented may include networks that implement one or more other technologies or protocols. Embodiments described herein may be described in the context of TDMA for simplicity.

The networks of FIG. 1 may experience interference among them that limits the capacity of each line (e.g., each network 102) to deliver high speed communication. The interference may include NEXT interference and/or FEXT interference. NEXT interference generally includes interference between nodes located at the same end of the bundle of phone line cables 108. FEXT interference generally includes interference between nodes located at opposite ends of the bundle of phone line cables 108.

FIG. 1 illustrates one example of NEXT interference 110 and one example of FEXT interference 112. In particular, when the master node 104A transmits in its network 102A, also referred to as a first network 102A, to the slave node 106A, the transmitted signal may couple into an adjacent network, also referred to as a neighbor network 102B, as interference. The interference on the neighbor network 102B may be received at either or both the master node 104B and the slave node 106B if either is receiving when the interference couples into the neighbor network 102B. The interference received at the master node 104B is the NEXT interference 110 since the master node 104B is at the same end of the bundle of phone line cables 108 as the master node 104A. The interference received at the slave node 106B is the FEXT interference 112 since the slave node 106B is at the opposite end of the bundle of phone line cables 108 from the master node 104A. Although not illustrated in FIG. 1, the network 102N and/or other networks 102 of the system 100 may also experience interference, e.g., either or both NEXT interference 110 and FEXT interference 112, from the first network 102A. Of the two types of interference, NEXT interference is typically more destructive to neighbor networks than FEXT interference.

Accordingly, some embodiments described herein may synchronize networks so that the nodes at each end of a bundle of phone line cables or other transmission media transmit and receive at the same time to avoid, or at least mitigate, NEXT interference. For example, in the system 100 of FIG. 1, the master nodes 104 may be synchronized to transmit and receive at the same time. In view of the synchronization of the master nodes 104 with each other, the slave nodes 106 may also be synchronized with each other to transmit and receive at the same time.

Figure 2:
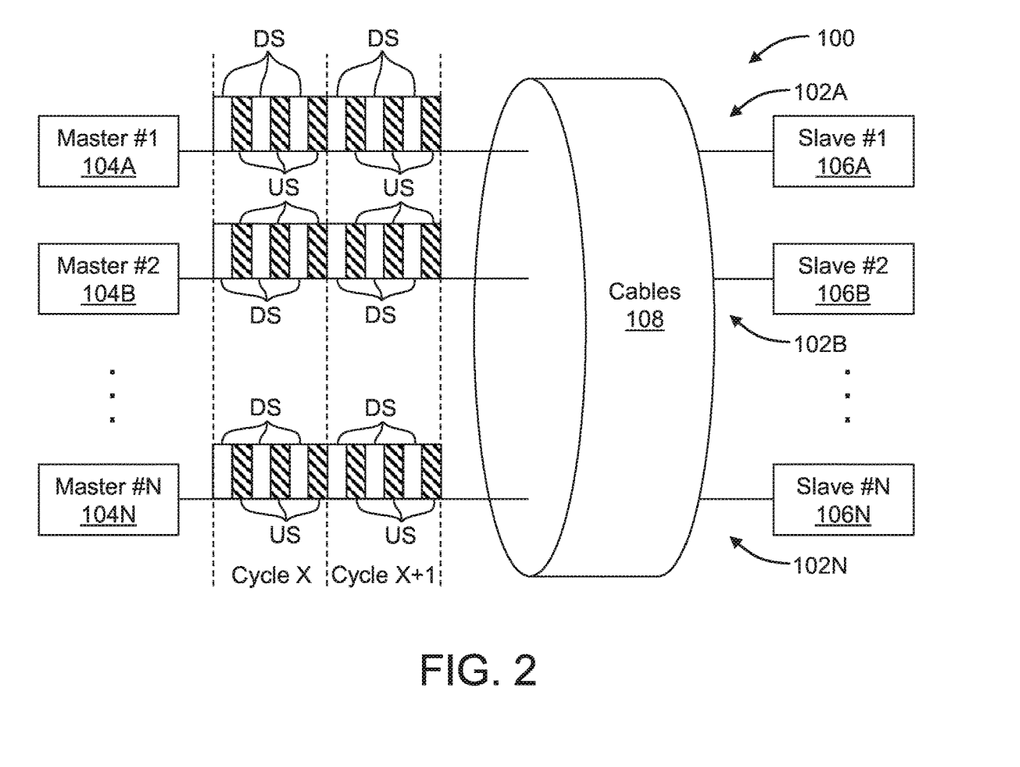
FIG. 2 illustrates the system of FIG. 1 with time synchronization for NEXT mitigation.

FIG. 2 illustrates the system 100 of FIG. 1 with time synchronization for NEXT mitigation, arranged in accordance with at least one embodiment described herein. As illustrated, the master nodes 104, e.g., at one end of the bundle of phone line cables 108, are synchronized with each other such that all master nodes 104 transmit and receive at the same time. Time slots allocated to the master nodes 104 to transmit are labeled "DS" in FIG. 2 for "downstream", while time slots allocated to the master nodes 104 to receive are labeled "US" in FIG. 2 for "upstream".

The master nodes 104 may be time synchronized such that they transmit and receive at the same time, e.g., respectively during the same DS and US time slots, and have cycles (e.g., "Cycle X", "Cycle X+1" in FIG. 2) that begin and end at the same time. Time synchronizing the master nodes 104 also time synchronizes the slave nodes 106 such that the slave nodes 106 transmit and receive at the same time.

When the master nodes 104 have time synchronized DS time slots (e.g., when they transmit at the same time), interference that couples from one of the networks 102 into any of the other networks 102 while one of the master nodes 104 is transmitting in a DS time slot will not be received by the other master nodes 104 as NEXT interference since the other master nodes 104 are not in a US time slot to receive. When the master nodes 104 have time synchronized US time slots (e.g., when they receive at the same time), none of the master nodes 104 is transmitting during an US time slot of any of the other master nodes 104 so there is no NEXT interference.

Embodiments described herein transmit a synchronization signal from one of the master nodes 104, referred to as a reference master node. to synchronize the master nodes 104. The synchronization signal may be provided to the other master nodes 104 in the system 100 through NEXT interference between the networks 102. The master nodes 104 may schedule their respective cycles of DS and US communications consistent with or according to the synchronization signal so that all master nodes 104 transmit and receive at the same time.

Figure 3:
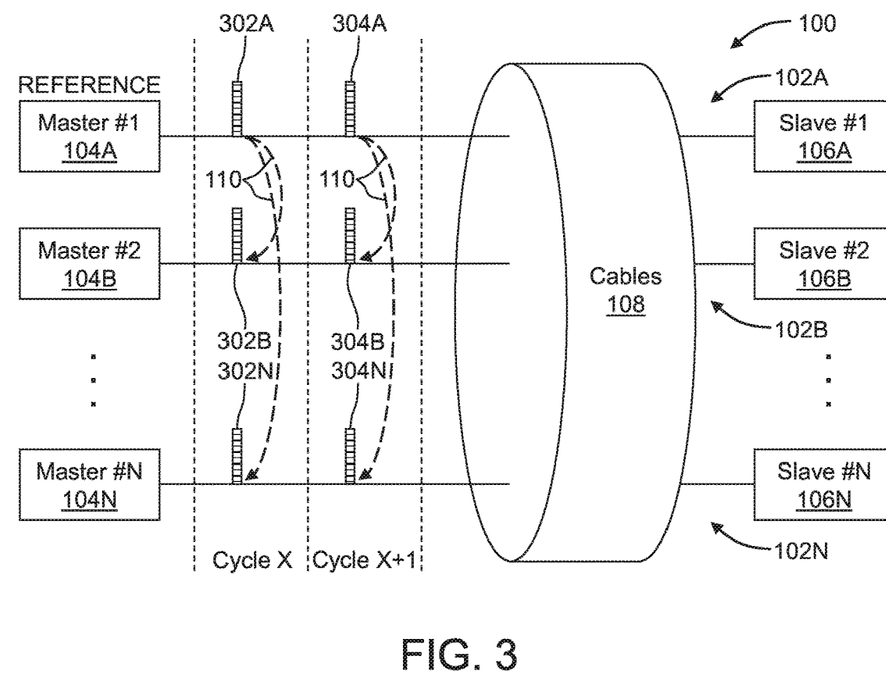
FIG. 3 illustrates the system of FIG. 1 with synchronization signals to synchronize master nodes of the system.

FIG. 3 illustrates the system 100 of FIG. 1 with synchronization signals 302A, 302B, . . . 302N (collectively hereinafter "synchronization signals 302") and 304A, 304B, . . . 304N (collectively hereinafter "synchronization signals 304") to synchronize the master nodes 104, arranged in accordance with at least one embodiment described herein.

In the example of FIG. 3, the master node 104A operates as a reference master node, as indicated by the term REFERENCE above the master node 104A in FIG. 3. The master node 104A may hereafter be referred to as master node 104A or reference master node 104A. The reference master node 104A may generally be configured to generate a synchronization signal during each cycle which includes, among potentially other information, an expected time when the reference master node 104A expects to start a next cycle. For example, the synchronization signal 302A generated and transmitted by the reference master node 104A during Cycle X may include an expected time when the reference master node 104A expects to start the next cycle, e.g., Cycle X+1. As another example, the synchronization signal 304A generated and transmitted by the reference master node 104A during Cycle X+1 may include an expected time when the reference master node 104A expects to start the next cycle, e.g., Cycle X+2 (not shown in FIG. 3).

Each of the synchronization signals 302, 304 may be or include a MAC frame. The synchronization signals 302, 304 and/or the MAC frames may be relatively short and/or as short as possible to minimize overhead time. By using short synchronization signals 302, 304 and/or short MAC frames, performance of the system 100 with the synchronization signals 302, 304 may be almost as fast as performance of the system 100 with a dedicated clock wire or with the PTP protocol.

The reference master node 104A may transmit the synchronization signal 302A, 304A onto the first network 102A and the synchronization signal 302A, 304A may be coupled into one or more of the other networks 102B, 102N (also referred to as neighbor networks 102B, 102N) and may be received at the other master nodes 104B, 104N through the NEXT interference 110, e.g., as synchronization signals 302B, 302N, 304B, 304N. Each of the synchronization signals 302A, 304A may be transmitted by the reference master node 104A at a time, e.g., during a designated time slot each cycle, when the other master nodes 104 open a receive window to receive the corresponding synchronization signal 302B, 302N, 304B, 304N. The designated time slot for the reference master node 104A to transmit the synchronization signal and for the other master nodes 104 to open a receive window may be the same or different from cycle to cycle. For example, the designated time slot may begin x seconds after the start of each cycle.

The particular master node 104 that operates as the reference master node (e.g., the reference master node 104A in this example) may be selected manually, may be selected by one or more of the master nodes 104 themselves, may be selected by an external application (see FIG. 6), or may be selected by some other entity(ies) and/or in some other manner. The designated time slot at which the reference master node 104A transmits the synchronization signal and at which the other master nodes 104 open the receive window to receive the synchronization signal may be selected manually, may be selected by one or more of the master nodes 104 themselves, may be selected by an external application (see FIG. 6), or may be selected by some other entity(ies) and/or in some other manner.

Each of the synchronization signals 302A, 304A generated by the reference master node 104A may include a corresponding value of an internal clock of the reference master node 104A when the corresponding synchronization signal 302A, 304A is transmitted by the reference master node 104A. This value of the internal clock of the reference master node 104A may be referred to as a network time reference (NTR_RF). As an example, the NTR_RF included in the synchronization signal 302A may include the value of the internal clock of the reference master node 104A when the synchronization signal 302A is transmitted by the reference master node 104A. As another example, the NTR_RF included in the synchronization signal 304A may include the value of the internal clock of the reference master node 104A when the synchronization signal 304A is transmitted by the reference master node 104A.

Each of the synchronization signals 302A, 304A may additionally include a value of the internal clock of the reference master node 104A when the next cycle of the first network 102A is expected to start. This value of the internal clock of the reference master node 104A may be referred to as a cycle start (CYCSTART). As an example, the CYCSTART included in the synchronization signal 302A may include the value of the internal clock of the reference master node 104A when the next cycle, e.g., Cycle X+1, is expected to start. As another example, the CYCSTART included in the synchronization signal 304A may include the value of the internal clock of the reference master node 104A when the next cycle, e.g., Cycle X+2 (not shown in FIG. 3), is expected to start.

Each of the synchronization signals 302A, 304A may additionally include a next sequence number (NEXT_SQN), e.g., a sequence number of the next cycle of the first network 102A. As an example, the NEXT_SQN included in the synchronization signal 302A may include the sequence number of the next cycle, or Cycle X+1 in this example. As another example, the NEXT_SQN included in the synchronization signal 304A may include the sequence number of the next cycle, or Cycle X+2 in this example.

Each of the master node 104B and the master node 104N receives the synchronization signal 302A from the reference master node 104A as the synchronization signal 302B or 302N. Each of the synchronization signals 302B, 302N may include the network time reference or NTR_REF and the cycle start or CYCSTART and optionally the next sequence number or NEXT_SQN. Each of the master nodes 104B, 104N can then determine when to start its next cycle in its corresponding network 102B, 102N, e.g., synchronized to the next cycle of the first network 102A, from the information included in the synchronization signal 302B, 302N according to the following formulas:

time to next cycle=CYCSTART−NTR_REF        Formula 1

Own CYCSTART=Local NTR+time to next cycle        Formula 2

In Formula 1, time to next cycle is an amount of time before the cycle (e.g., the next cycle) of the first network 102A is expected to start, which may be determined by subtracting the NTR_REF included in the synchronization signal 302B, 304B from the CYCSTART included in the synchronization signal 302B, 304B. As an example, the time to next cycle determined by the master node 104B, 104N from the synchronization signal 302B, 302N may be determined by subtracting the NTR_RF (e.g., the value of the internal clock of the reference master node 104A when the synchronization signal 302A was transmitted by the reference master node 104A) from the CYCSTART (e.g., the value of the internal clock of the reference master node 104A when the next cycle of the first network 102A is expected to start), where each of the NTR_RF and CYCSTART is included in the synchronization signal 302B, 302N.

In Formula 2, Own CYCSTART is a corresponding network time reference of the master node 104B, 104N at which the cycle (e.g., the next cycle) of the corresponding network 102B, 102N is expected to start if it is to be synchronized with the cycle (e.g., the next cycle) of the first network 102A. The Own CYCSTART may be determined by summing the time to next cycle with a value of an internal clock of the master node 104B, 104N when the corresponding synchronization signal 302B, 302N, 304B, 304N is received, referred to as Local NTR. As an example, the Own CYCSTART determined by the master node 104B, 104N based on the time to next cycle determined from the synchronization signal 302B, 302N may be determined by summing the corresponding time to next cycle for the Cycle X+1 with the Local NTR of the master node 102B, 102N for the synchronization signal 302B, 302N.

When a given one of the master nodes 104B, 104N is synchronized with the reference master node 104A, it schedules DS/US time slots with its slave node 106B, 106N as usual and opens a receive window during each subsequent cycle to receive the corresponding synchronization signal from the reference master node 104A. As previously mentioned, the receive window may be opened during a designated time slot each cycle.

Figure 4:
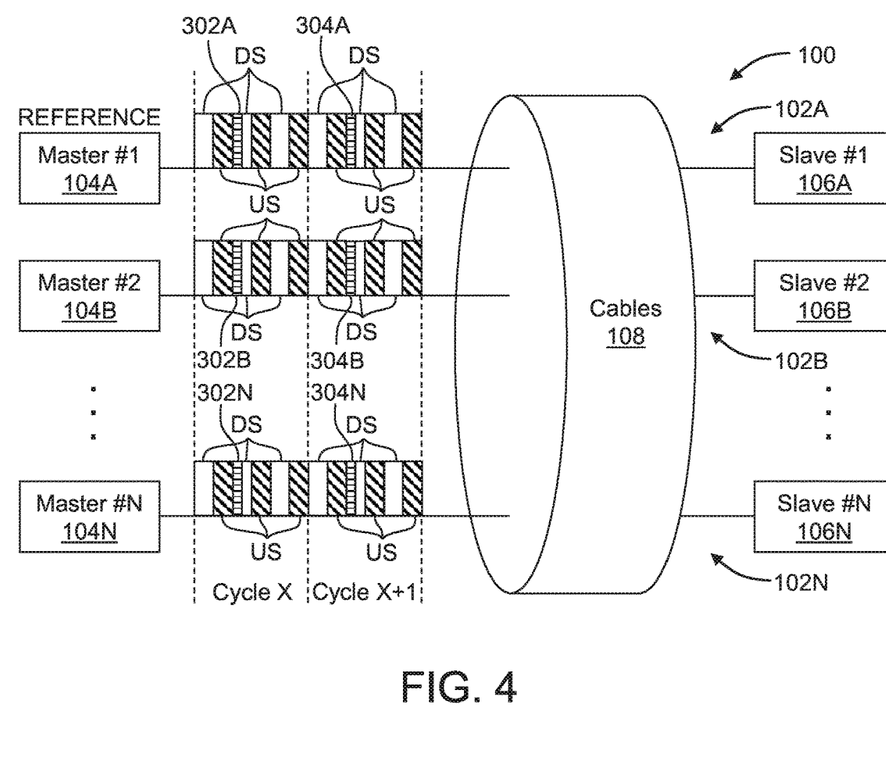
FIG. 4 illustrates the system of FIG. 1 with downstream (DS) and upstream (US) time slots of FIG. 2 and the synchronization signals of FIG. 3.

FIG. 4 illustrates the system 100 of FIG. 1 with the DS and US time slots of FIG. 2 and the synchronization signals 302 and 304 of FIG. 3, arranged in accordance with at least one embodiment described herein. As illustrated in FIG. 4, the reference master node 104A may transmit a synchronization signal during each of its cycles between the first US time slot and the second DS time slot of each of its cycles. The master nodes 104B, 104N may open a receive window at this same time in each of their respective cycles to receive the synchronization signal to maintain synchronization from cycle to cycle.

Complete visibility between the reference master node 104A and all of the other master nodes 104 is not guaranteed. In particular, one or more of the other master nodes 104, such as the master node 104N, may not be subject to NEXT interference from the reference master node 104A in some implementations. As a result, in this example, the master node 104N may not receive the synchronization signals from the reference master node 104A through NEXT interference. Even so, the master nodes 104N may be subject to NEXT interference from other master nodes 104 in the system 100, such as the master node 104B, which may be subject to NEXT interference from the reference master node 104A. It may be beneficial to synchronize the master node 104N that is not subject to NEXT interference from the reference master node 104A with the master node 104B that is subject to NEXT interference from the reference master node 104A to mitigate NEXT interference between the master node 104B and the master node 104N. Accordingly, some embodiments of the system 100 may include a synchronization signal repeater master node to generate and transmit a relay synchronization signal to master nodes 104 that lack visibility to the reference master node 104A so that master nodes 104 in the system 100 that lack visibility to the reference master node 104A are synchronized with all master nodes 104 in the system 100 despite the lack of visibility to the reference master node 104A. An example is illustrated in and described with respect to FIG. 5.

Figure 5:
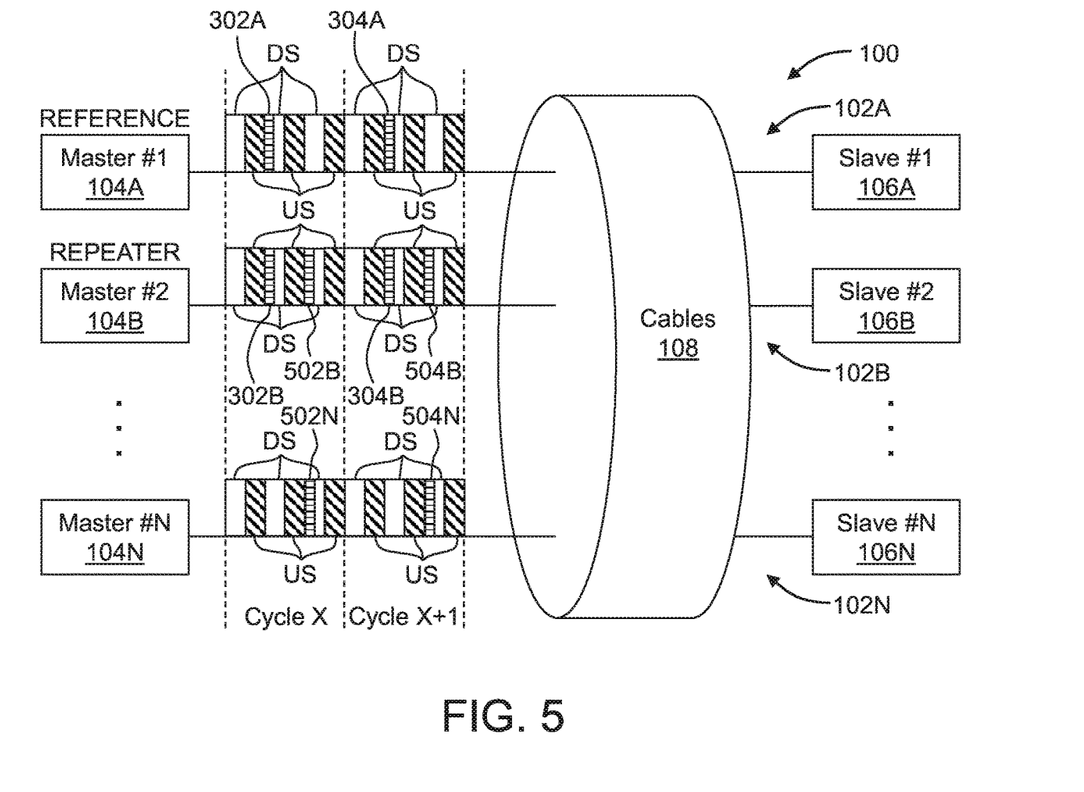
FIG. 5 illustrates the system of FIG. 1 with a synchronization signal repeater master node.

FIG. 5 illustrates the system 100 of FIG. 1 with a synchronization signal repeater master node (hereinafter "repeater master node"), arranged in accordance with at least one embodiment described herein. In particular, in the example of FIG. 5, the master node 104B operates as a repeater master node, as indicated by the term REPEATER above the master node 104B in FIG. 5. The master node 104B may hereafter be referred to as master node 104B or repeater master node 104B.

In the example of FIG. 5, the master node 104N lacks visibility to the reference master node 104A such that the synchronization signals generated and transmitted by the reference master node 104A during the designated time slot each cycle do not couple into the network 102N, e.g., by NEXT interference, and are therefore not received by the master node 104N during the designated time slot. To synchronize the master node 104N with the other master nodes 104 in the system 100, the repeater master node 104B may therefore generate and transmit a relay synchronization signal during a different designated time slot each cycle, which may be received through NEXT interference by the master node 104N during the different designated time slot each cycle. The different designated time slot each cycle during which the relay synchronization signal is transmitted and received may be referred to as the designated relay time slot. The master node 104N may open a receive window during the designated relay time slot to receive the relay synchronization signal through NEXT interference.

In more detail, in the example of FIG. 5, the repeater master node 104B may receive the synchronization signal 302B, 304B during the designated time slot. The repeater master node 104B may then generate and transmit a corresponding relay synchronization signal 502B, 504B during the designated relay time slot within the same cycle during which the repeater master node 104B receives the corresponding synchronization signal 302B, 304B. As an example, the repeater master node 104B in FIG. 5 receives the synchronization signal 302B during the designated time slot of Cycle X, then generates and transmits the relay synchronization signal 502B during the designated relay time slot of Cycle X. The master node 104N receives the relay synchronization signal 502B as relay synchronization signal 502N during the designated relay time slot of Cycle X and uses the relay synchronization signal 502N to synchronize to the other master nodes 104, including scheduling US and DS communications in the network 102N based on the relay synchronization signal 502N the same as if it had received the synchronization signal 302A. As another example, the repeater master node 104B in FIG. 5 receives the synchronization signal 304B during the designated time slot of Cycle X+1, then generates and transmits the relay synchronization signal 504B during the designated relay time slot of Cycle X+1. The master node 104N receives the relay synchronization signal 504B as relay synchronization signal 504N during the designated relay time slot of Cycle X+1 and uses the relay synchronization signal 504N to synchronize to the reference master node 104A, including scheduling US and DS communications in the network 102N based on the relay synchronization signal 504N the same as if it had received the synchronization signal 304A.

The designated relay time slot at which the repeater master node 104B transmits the relay synchronization signal and at which the master node 104N opens the receive window to receive the relay synchronization signal may be selected manually, may be selected by one or more of the master nodes 104 themselves, may be selected by an external application (see FIG. 6), or may be selected by some other entity(ies) and/or in some other manner. The designated relay time slot is illustrated in FIG. 5 as occurring between the second US time slot and the third DS time slot of each cycle but may more generally occur at any time after the designated time slot for the synchronization signal. The master node 104N may open a receive window at this same time in each of its respective cycles to receive the relay synchronization signal to maintain synchronization with the reference master node 104A from cycle to cycle.

Modifications, additions, or omissions may be made to embodiment of FIG. 5 without departing from the scope of the present disclosure. For example, while FIG. 5 includes a single repeater master node 104B, more generally embodiments described herein may include one or more repeater master nodes.

Figure 6:
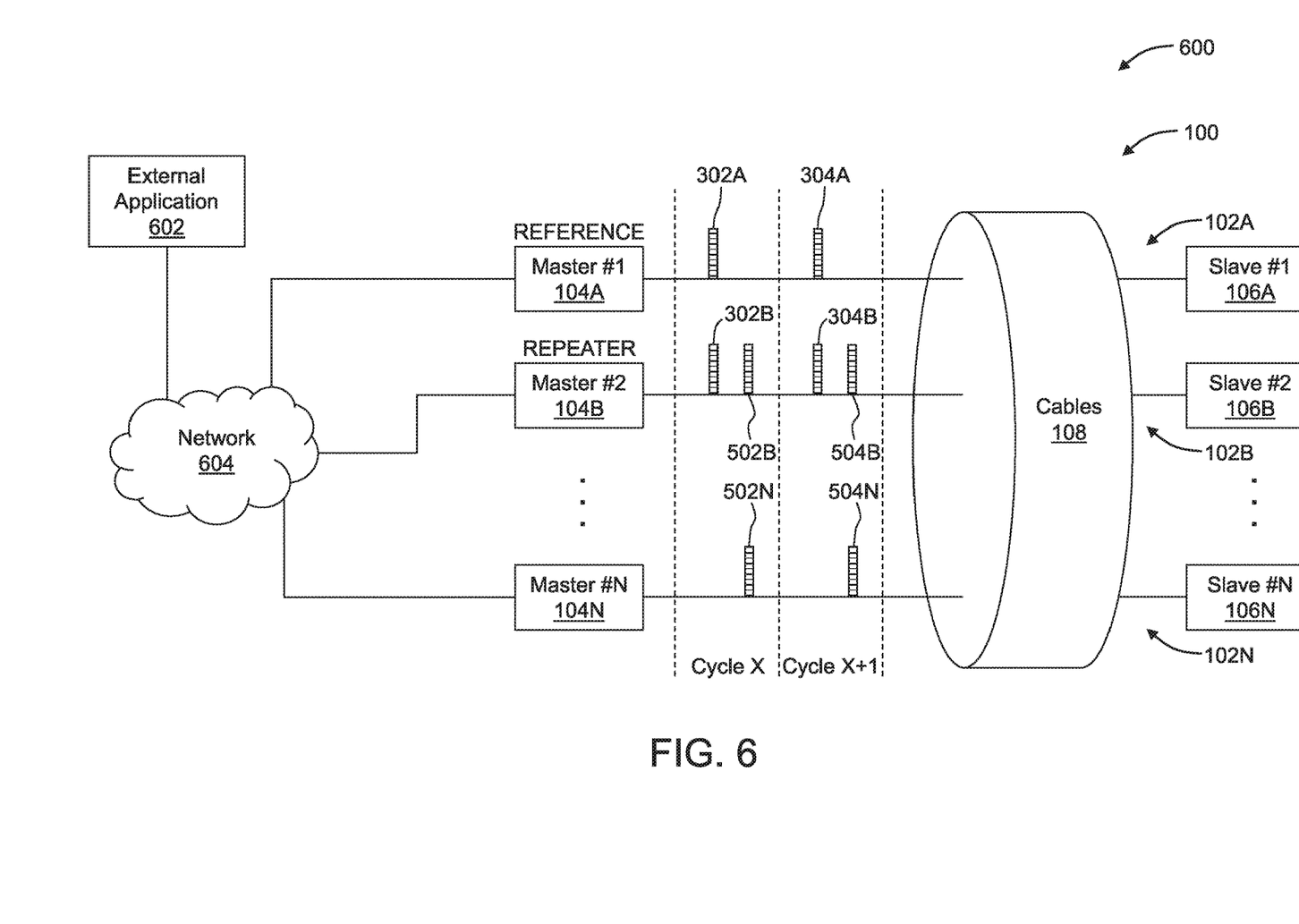
FIG. 6 illustrates the system of FIG. 1 integrated into another example system that further includes an external application and a network.

FIG. 6 illustrates the system 100 of FIG. 1 integrated into another example system 600 that further includes an external application 602 and a network 604, arranged in accordance with at least one embodiment described herein. FIG. 6 illustrates the synchronization signals 302A, 302B, 304A, 304B and the relay synchronization signals 502B, 502N, 504B, 504N discussed elsewhere herein. The US and DS time slots illustrated in some of the other figures are omitted in FIG. 6 for simplicity. While the US and DS time slots are not illustrated in FIG. 6, the master nodes 104 in FIG. 6 may nevertheless schedule their cycles of US and DS time slots consistent with or according to the synchronization signals 302A, 302B, 304A, 304B and/or the relay synchronization signals 502B, 502N, 504B, 504N as described herein.

The external application 602 is an example of the external applications discussed herein. The external application 602 may be configured to monitor, control, and/or direct operation of the master nodes 104 and may be communicatively coupled to the master nodes 104 through the network 604. In these and other embodiments, the external application 602 may be configured to determine or select which of the master nodes 104 operate as the reference master node or as synchronization signal repeater master node(s). Alternatively or additionally, the external application 602 may be configured to determine or select the designated time slot at which the reference master node transmits the synchronization signal and at which the other master nodes open the receive window to receive the synchronization signal. Alternatively or additionally, the external application 602 may be configured to determine or select the designated relay time slot at which each of one or more synchronization signal repeater master nodes transmits the relay synchronization signal and at which one or more other master nodes open the receive window to receive the relay synchronization signal. The external application 602 may determine or select any of the foregoing using any suitable data, criteria, or algorithm.

The external application 602 may operate remotely from the master nodes 104, e.g., in the cloud, on one or more servers or other hardware platform. The external application 602 may communicate with the master nodes 104 to, e.g., instruct corresponding ones of the master nodes 104 to operate as a reference master node or as a synchronization signal repeater master node or to inform them of the designated time slot for the synchronization signal or of the designated relay time slot for the relay synchronization signal. Alternatively or additionally, the external application 602 may be in communication with the master nodes 104 to determine failure of the reference master node or the synchronization signal repeater master node(s). In the event of such failure, the external application 602 may determine or select a new reference master node or a new synchronization signal repeater master node and may instruct the corresponding master node 104 to operate as such.

In general, the network 604 may include one or more wide area networks (WANs) and/or local area networks (LANs) that enable the external application 602 and the master nodes 104 to communicate with each other. In some embodiments, the network 604 may include the Internet, including a global internetwork formed by logical and physical connections between multiple WANs and/or LANs. Alternately or additionally, the network 604 may include one or more cellular radio frequency (RF) networks and/or one or more wired and/or wireless networks such as 802.xx networks, Bluetooth access points, wireless access points, Internet Protocol (IP)-based networks, or other wired and/or wireless networks. The network 604 may also include servers that enable one type of network to interface with another type of network.

Figure 7:
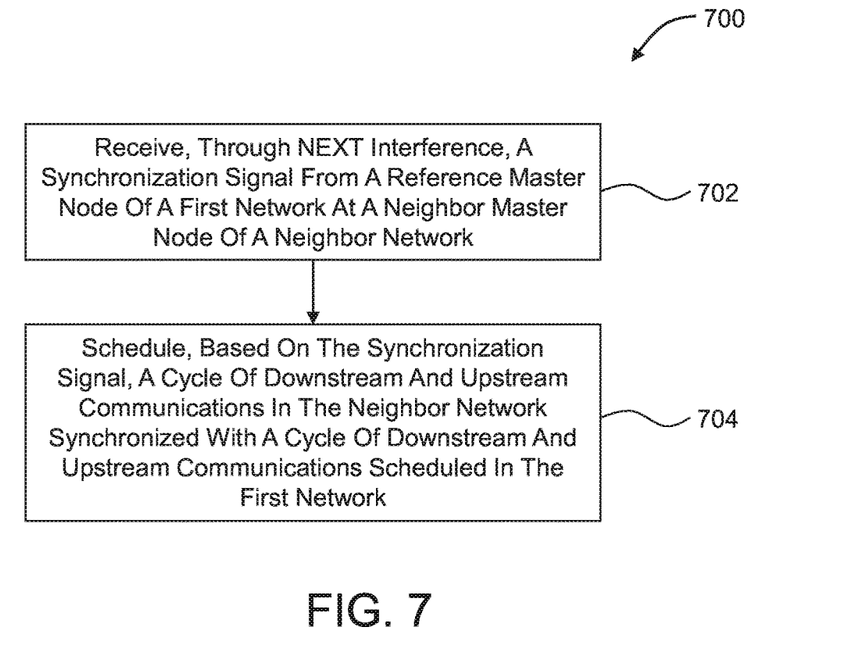
FIG. 7 is a flowchart of an example method to mitigate NEXT interference in networks.

FIG. 7 is a flowchart of an example method 700 to mitigate NEXT interference in networks, arranged in accordance with at least one embodiment described herein. The method 700 may be implemented, in whole or in part, by a master node, such as any of the master nodes 104 of FIG. 1. In an example embodiment, the method 700 is implemented by one of the master nodes 104, referred to in the discussion of FIG. 7 as a neighbor master node, that is subject to NEXT interference from another master node 104 that operates as the reference master node. Alternatively or additionally, software in the form of computer-executable instructions stored in memory or another non-transitory computer-readable medium of the neighbor master node may be executed by a processor of the neighbor master node to cause the corresponding processor to perform or control performance of one or more of the operations or blocks of the method 700. The method 700 may include one or more of blocks 702 or 704. The method 700 may begin at block 702.

At block 702, a synchronization signal may be received from a reference master node of a first network through NEXT interference at the neighbor master node of a neighbor network. For example, referring to FIGS. 3 and 4, the master node 104B as a neighbor master node in the neighbor network 102B may receive, through NEXT interference 110, the synchronization signal 302A as the synchronization signal 302B from the reference master node 104A in the first network 102A. Block 702 may be followed by block 704.

At block 704, the neighbor master node may schedule, based on the synchronization signal, a cycle of downstream and upstream communications in the neighbor network synchronized with a cycle of downstream and upstream communications scheduled in the first network. For example, referring to FIGS. 3 and 4, the neighbor master node 104B may schedule, within the neighbor network 102B, Cycle X+1 and its downstream and upstream communications synchronized with those of the reference master node 104A in the first network 102A based on the information included in the synchronization signal 302B received at the neighbor master node 104B during Cycle X.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 700 may also include opening a receive window at the neighbor master node during the scheduled cycle in the neighbor network to receive a new synchronization signal from the reference master node. The method 700 may also include receiving the new synchronization signal at the neighbor master node through NEXT interference. The method 700 may also include scheduling, based on the new synchronization signal, a new cycle of downstream and upstream communications in the neighbor network synchronized with a new cycle of downstream and upstream communications scheduled in the first network. As a specific example, and referring to FIGS. 3 and 4, the neighbor master node 104B may open a receive window during Cycle X+1, and specifically during the designated time slot within Cycle X+1, in the neighbor network 102B to receive the synchronization signal 304A from the reference master node 104A as the synchronization signal 304B. The neighbor master node 104B may receive the synchronization signal 304B through NEXT interference. The neighbor master node 104B may schedule, within the neighbor network 102B and based on the synchronization signal 304B, Cycle X+2 (not shown in FIGS. 3 and 4) and its downstream and upstream communications synchronized with those of reference master node 104A in the first network 102A based on the information included in the synchronization signal 304B received at the neighbor master node 104B during Cycle X+1.

In an embodiment, scheduling the cycle of downstream and upstream communications in the neighbor network at block 704 may include determining from the synchronization signal an amount of time before the cycle of the first network is expected to start, e.g., according to Formula 1; and determining from the amount of time a neighbor network time reference at which the cycle of the neighbor network is expected to start, e.g., according to Formula 2. In this and other embodiments, the method 700 may further include determining from the synchronization signal a sequence number of the cycle of the first network; and synchronizing a sequence number of the cycle of the neighbor network to the sequence number of the cycle of the first network at a media access control (MAC) cycle level.

Alternatively or additionally, determining from the synchronization signal the amount of time before the cycle of the first network is expected to start may include subtracting a NTR_RF included in the synchronization signal from a CYCSTART included in the synchronization signal, e.g., as described herein with respect to Formula 1. As described herein, the NTR_RF may include a value of an internal clock of the reference master node when the synchronization signal was transmitted by the reference master node. The CYCSTART may include a value of the internal clock of the reference master node when the cycle of the first network is expected to start. In this and other embodiments, determining from the amount of time the neighbor network time reference at which the cycle of the neighbor network is expected to start may include summing a value of an internal clock of the neighbor master node when the synchronization signal is received by the neighbor master node with the amount of time as described herein with respect to Formula 2.

In an embodiment, the neighbor master node may operate as a new reference master node in response to failure of the reference master node. In this and other embodiments, the method may further include generating a new synchronization signal at the new reference master node; and transmitting the new synchronization signal from the new reference master node in the neighbor network to one or more other neighbor master nodes in one or more other neighbor networks through NEXT interference.

In an embodiment, a second neighbor master node (such as the master node 104N) in a second neighbor network (such as the network 106N) lacks visibility to the reference master node (e.g., the reference master node 104A). In this and other embodiments, the method 700 may further include generating a relay synchronization signal (such as relay synchronization signal 502B, 504B) at the neighbor master node (such as the neighbor master node 104B operating as the repeater master node 104B) based on the synchronization signal; and transmitting the relay synchronization signal from the neighbor master node in the neighbor network, where the relay synchronization signal is coupled into the second neighbor network through NEXT interference. In an example, and prior to the neighbor master node generating the relay synchronization signal, the neighbor master node may receive an instruction from an external application (such as the external application 602 of FIG. 6) that the neighbor master node is to operate as a synchronization signal repeater master node.

Figure 8:
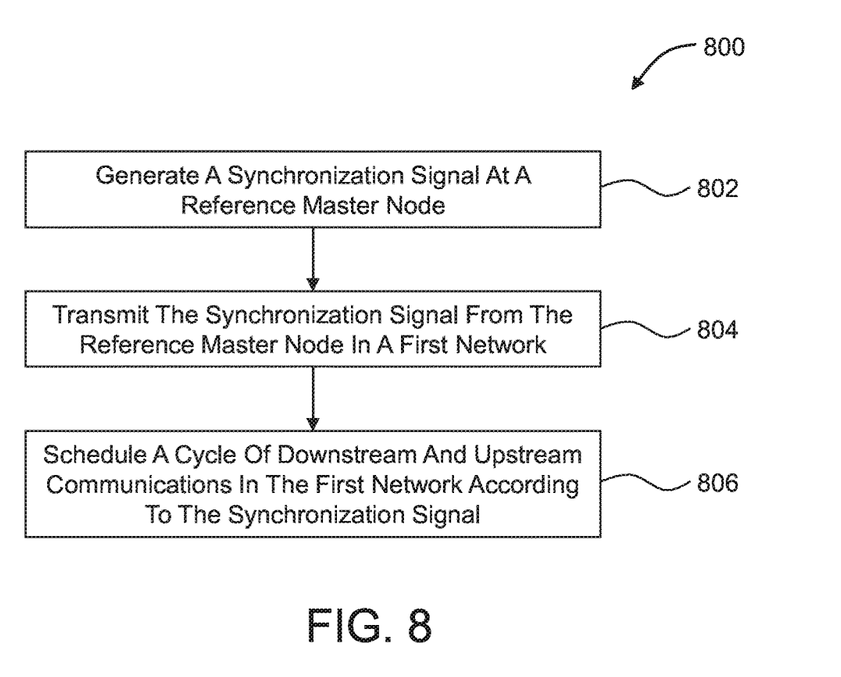
FIG. 8 is a flowchart of another example method to mitigate NEXT interference in networks.

FIG. 8 is a flowchart of another example method 800 to mitigate NEXT interference in networks, arranged in accordance with at least one embodiment described herein. The method 800 may be implemented, in whole or in part, by a master node, such as any of the master nodes 104 of FIG. 1. In an example embodiment, the method 800 is implemented by one of the master nodes 104, referred to in the discussion of FIG. 8 as a reference master node, that subjects other master nodes 104 to NEXT interference. Alternatively or additionally, software in the form of computer-executable instructions stored in memory or another non-transitory computer-readable medium of the reference master node may be executed by a processor of the reference master node to cause the corresponding processor to perform or control performance of one or more of the operations or blocks of the method 800. The method 800 may include one or more of blocks 802, 804, or 806. The method 800 may begin at block 802.

At block 802, a synchronization signal may be generated at the reference master node. For example, referring to FIGS. 3 and 4, the reference master node 104A may generate the synchronization signal 302A.

Generating the synchronization signal at the reference master node at block 802 may include packaging a network time reference (NTR_REF) and a cycle start (CYCSTART) in the synchronization signal. The NTR_RF may include a value of an internal clock of the reference master node when the synchronization signal is transmitted by the reference master node. The CYCSTART may include a value of the internal clock of the reference master node when the scheduled cycle of the first network is expected to start. Generating the synchronization signal at the reference master node at block 802 may also include packaging a next sequence number (NEXT_SQN) in the synchronization signal. The NEXT_SQN may include a sequence number of the scheduled cycle of the first network. Block 802 may be followed by block 804.

At block 804, the synchronization signal may be transmitted from the reference master node in a first network. For example, referring to FIGS. 3 and 4, the synchronization signal 302A may be transmitted from the reference master node 104A. The synchronization signal may be coupled into a neighbor network through NEXT interference. For example, the synchronization signal 302A may be coupled into the neighbor network 102B through NEXT interference 110. Block 804 may be followed by block 806.

At block 806, a cycle of downstream and upstream communications in the first network may be scheduled according to the synchronization signal. For example, referring to FIGS. 3 and 4, Cycle X+1 of downstream and upstream communications in the first network 102A may be scheduled according to the synchronization signal 302A. In more detail, Cycle X+1 may be scheduled to start in the first network 102A at the CYCSTART, e.g., the value of the internal clock of the reference master node 104A, when Cycle X+1 of the first network 102A is expected to start.

In an embodiment, a neighbor master node in the neighbor network may be configured to receive the synchronization signal through NEXT interference. The neighbor master node may also be configured to schedule, based on the synchronization signal, a cycle of downstream and upstream communications in the neighbor network synchronized with the scheduled cycle of downstream and upstream communications in the first network. For example, referring to FIGS. 3 and 4, the neighbor master node 104B in the neighbor network 102B may be configured to receive the synchronization signal 302A as synchronization signal 302B through NEXT interference 110. In addition, the neighbor master node 104B may also be configured to schedule, based on the synchronization signal 302B, Cycle X+1 of downstream and upstream communications in the neighbor network 102B synchronized with Cycle X+1 of downstream and upstream communications in the first network 102A.

In an embodiment, the method 800 may include receiving an instruction from an external application (such as the external application 602 of FIG. 6) that the reference master node is to operate as the reference master node. The instruction may be received prior to transmitting the synchronization signal from the reference master node at block 804.

In an embodiment, the method 800 may include transmitting the synchronization signal from the reference master node at a time when the neighbor master node is expected to open a receive window to receive the synchronization signal. The time when the neighbor master node is expected to open the receive window may be the designated time slot as described herein. Alternatively or additionally, the method 800 may include, prior to transmitting the synchronization signal from the reference master node at the time when the neighbor master node is expected to open the receive window, receiving a communication from an external application (such as the external application 602 of FIG. 6) that designates the time when the neighbor master node is expected to open the receive window In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method to mitigate near end cross talk (NEXT) interference in networks, the method comprising:
  receiving, through NEXT interference, a synchronization signal from a reference master node of a first network at a neighbor master node of a neighbor network;
  scheduling, based on the synchronization signal, a cycle of downstream and upstream communications in the neighbor network synchronized with a cycle of downstream and upstream communications scheduled in the first network; and opening a receive window at the neighbor master node during the scheduled cycle in the neighbor network to receive a new synchronization signal from the reference master node.

2. The method of claim 1, further comprising:
receiving the new synchronization signal at the neighbor master node through NEXT interference; and
scheduling, based on the new synchronization signal, a new cycle of downstream and upstream communications in the neighbor network synchronized with a new cycle of downstream and upstream communications scheduled in the first network.

3. The method of claim 1, wherein scheduling the cycle of downstream and upstream communications in the neighbor network comprises:
determining from the synchronization signal an amount of time before the cycle of the first network is expected to start; and
determining from the amount of time a neighbor network time reference at which the cycle of the neighbor network is expected to start.

4. The method of claim 3, further comprising:
determining from the synchronization signal a sequence number of the cycle of the first network; and
synchronizing a sequence number of the cycle of the neighbor network to the sequence number of the cycle of the first network at a media access control (MAC) cycle level.

5. The method of claim 3, wherein:
determining from the synchronization signal the amount of time before the cycle of the first network is expected to start comprises subtracting a network time reference (NTR_RF) included in the synchronization signal from a cycle start (CYCSTART) included in the synchronization signal;
the NTR_RF comprises a value of an internal clock of the reference master node when the synchronization signal was transmitted by the reference master node; and
the CYCSTART comprises a value of the internal clock of the reference master node when the cycle of the first network is expected to start.

6. The method of claim 5, wherein determining from the amount of time the neighbor network time reference at which the cycle of the neighbor network is expected to start comprises summing a value of an internal clock of the neighbor master node when the synchronization signal is received by the neighbor master node with the amount of time.

7. The method of claim 1, wherein the neighbor master node operates as a new reference master node in response to failure of the reference master node, the method further comprising:
generating a new synchronization signal at the new reference master node; and
transmitting the new synchronization signal from the new reference master node in the neighbor network to one or more other neighbor master nodes in one or more other neighbor networks through NEXT interference.

8. The method of claim 1, wherein a second neighbor master node in a second neighbor network lacks visibility to the reference master node, the method further comprising:
generating a relay synchronization signal at the neighbor master node based on the synchronization signal; and
transmitting the relay synchronization signal from the neighbor master node in the neighbor network, wherein the relay synchronization signal is coupled into the second neighbor network through NEXT interference.

9. The method of claim 8, further comprising, prior to generating the relay synchronization signal, receiving an instruction from an external application that the neighbor master node is to operate as a synchronization signal repeater master node.

10. A method to mitigate near end cross talk (NEXT) interference in networks, the method comprising:
generating a synchronization signal at a reference master node;
transmitting the synchronization signal from the reference master node in a first network, wherein the synchronization signal is coupled into a neighbor network through NEXT interference; and
scheduling a cycle of downstream and upstream communications in the first network according to the synchronization signal, wherein a start time of the cycle is determined using the synchronization signal,
wherein a neighbor master node in the neighbor network is configured to receive the synchronization signal through NEXT interference and to schedule, based on the synchronization signal, a cycle of downstream and upstream communications in the neighbor network synchronized with the scheduled cycle of downstream and upstream communications in the first network,
wherein the synchronization signal is transmitted at a time when the neighbor master node is expected to open a receive window to receive the synchronization signal.

11. The method of claim 10, further comprising, prior to transmitting the synchronization signal from the reference master node, receiving an instruction from an external application that the reference master node is to operate as the reference master node.

12. The method of claim 10, further comprising, prior to transmitting the synchronization signal from the reference master node at the time when the neighbor master node is expected to open the receive window, receiving a communication from an external application that designates the time when the neighbor master node is expected to open the receive window.

13. The method of claim 10, wherein:
generating the synchronization signal at the reference master node comprises packaging a network time reference (NTR_REF), a cycle start (CYCSTART), and a next sequence number (NEXT_SQN) in the synchronization signal;
the NTR_RF comprises a value of an internal clock of the reference master node when the synchronization signal is transmitted by the reference master node;
the CYCSTART comprises a value of the internal clock of the reference master node when the scheduled cycle of the first network is expected to start; and
the NEXT_SQN comprises a sequence number of the scheduled cycle of the first network.

14. A system to mitigate near end cross talk (NEXT) interference in networks, the system comprising:
a plurality of master nodes, each communicatively coupled to a different slave node of a plurality of slave nodes,
wherein the plurality of master nodes comprises:
a reference master node configured to generate and transmit a synchronization signal in a first network of the reference master node and to schedule a cycle of downstream and upstream communications in the first network according to the synchronization signal;

a neighbor master node in a neighbor network configured to receive the synchronization signal from the reference master node through NEXT interference between the first network and the neighbor network and to schedule, based on the synchronization signal, a cycle of downstream and upstream communications in the neighbor network synchronized with the cycle of downstream and upstream communications in the first network, wherein a start time of the cycle is determined using the synchronization signal; and a synchronization signal repeater master node configured to receive the synchronization signal through NEXT interference, generate a relay synchronization signal at the synchronization signal repeater master node based on the synchronization signal, and transmit the relay synchronization signal from the synchronization signal repeater master node in a network of the synchronization signal repeater master node.

15. The system of claim 14,
wherein a second neighbor master node of the plurality of master nodes lacks visibility to the reference master node and is configured to receive the relay synchronization signal through NEXT interference and to schedule, based on the relay synchronization signal, a cycle of downstream and upstream communications in a second neighbor network of the second neighbor master node synchronized with the scheduled cycle of downstream and upstream communications in the first network.

16. The system of claim 14, wherein the synchronization signal comprises:

a network time reference (NTR_REF) that includes a value of an internal clock of the reference master node when the synchronization signal is transmitted by the reference master node; and a cycle start (CYCSTART) that includes a value of the internal clock of the reference master node when the scheduled cycle of the first network is expected to start.

17. The system of claim 16, wherein the synchronization signal further comprises a next sequence number (NEXT_SQN) that includes a sequence number of the scheduled cycle of the first network.

18. The system of claim 16, wherein the neighbor master node is configured to schedule the cycle of downstream and upstream communications in the neighbor network by:

determining from the synchronization signal an amount of time before the cycle of the first network is expected to start; and determining from the amount of time a neighbor network time reference at which the cycle of the neighbor network is expected to start.

19. The system of claim 18, wherein:
determining from the synchronization signal the amount of time before the cycle of the first network is expected to start comprises subtracting the NTR_RF included in the synchronization signal from the CYCSTART included in the synchronization signal; and determining from the amount of time the neighbor network time reference at which the cycle of the neighbor network is expected to start comprises summing a value of an internal clock of the neighbor master node when the synchronization signal is received by the neighbor master node with the amount of time.

* * * * *